United States Patent [19]
Williamson et al.

[11] Patent Number: 5,741,467
[45] Date of Patent: Apr. 21, 1998

[54] PALLADIUM CATALYST WASHCOAT SUPPORTS FOR IMPROVED METHANE OXIDATION IN NATURAL GAS AUTOMOTIVE EMISSION CATALYSTS

[75] Inventors: W. Burton Williamson, Broken Arrow; Ronald G. Silver, Tulsa, both of Okla.

[73] Assignee: ASEC Manufacturing, Tulsa, Okla.

[21] Appl. No.: 476,342

[22] Filed: Jun. 7, 1995

[51] Int. Cl.$^6$ .................................................. B01D 53/94
[52] U.S. Cl. ................................... 423/213.5; 423/213.7
[58] Field of Search ........................... 423/213.5, 213.7

[56] References Cited

U.S. PATENT DOCUMENTS

| | | | |
|---|---|---|---|
| 4,675,308 | 6/1987 | Wan et al. | 423/213.5 |
| 4,868,149 | 9/1989 | Bricker | 502/303 |
| 4,960,574 | 10/1990 | Bricker | 423/213.5 |
| 5,041,407 | 8/1991 | Williamson et al. | 423/213.5 |
| 5,131,224 | 7/1992 | Siewert et al. | 423/213.5 |
| 5,176,887 | 1/1993 | Watkins | 423/213.2 |
| 5,179,053 | 1/1993 | Subramanian | 423/213.5 |
| 5,316,991 | 5/1994 | Subramanian | 502/65 |

FOREIGN PATENT DOCUMENTS

| | | | |
|---|---|---|---|
| 0310398A1 | 4/1989 | European Pat. Off. | |
| 0566401A1 | 10/1993 | European Pat. Off. | |
| 89-56324 | 11/1989 | Japan | 423/213.5 |
| 6-246159 | 9/1994 | Japan | |
| 9201882 | 3/1993 | WIPO | |

OTHER PUBLICATIONS

E.R. Becker et al., Catalyst Design for Emission Control of Carbon Monoxide and Hydrocarbons from Gas Engines, Jun. 1988, Association Dedicated to Air Pollution Control and Hazardous Waste Management Annual Meeting, pp. 1–15.

Robert F. Hicks, et al., Structure Sensitivity of Methane Oxidation over Platinum and Palladium, 1990, Journal of Catalysis, pp. 280–294. (Month of publication is not available).

Robert F. Hicks et al., Effect of Catalyst Structure on Methane Oxidation over Palladium on Alumina, 1990, Journal of Catalysis, pp. 295–306. (Month of publication is not available).

Jacob Klimstra, Catalytic Converters for Natural Gas Fueled Engines—A Measurement and Control Problem, 1987, Society of Automotive Engineers 892133. pp. 1,2. (Month of publiction is not available).

Joseph T. Kummer, Review of Factors Related to Natural Gas Engine Emission Controls: Catalysts for NO Decomposition under Oxygen Rich Conditions—Methane Oxidation, Feb. 1991, Gas Research Institute Natural Gas Engine Catalyst Workshop, pp. 7–16.

William E. Liss & William H. Thrasher, Natural Gas as a Stationary Engine and Vehicular Fuel, Oct. 1991, Society of Automotive Engineers 912364, pp. 43–62.

Se H. Oh. et al., Methane Oxidation over Alumina–Supported Noble Metal Catalysts with and without Cerium Additives, 1991, Journal of Catlysis, pp. 287–301. (Month of publication is not available).

J.C. Summers Control of $No_x/CO/HC$ Emissions from Natural Gas Fueled Stationary Engines with Three–Way Catalysts, Jun. 16–21, 1991, Allied Signal AWMA Annual Meeting, pp. 1–19.

Christopher S. Weaver, Natural Gas Vehicles—A Review of the State of the Art, Sep. 1989, Society of Authomotive Engineers 892133, pp. 35–55.

W. Burton Williamson et al., Poisoning of Platinum— Rhodium Automotive Three–Way Catalysts: Behavior of Single Component Catalysts and Effects of Sulfur and Phosphorous, Mar. 1980, Environmental Science & Technology, pp. 319–324.

Klinghoffer, A.A., et al., "Transient Response of a Monolithic Oxidation Catalyst, in Environmental Catalysis" ACS Symposium Series 552, American Chemical Society, Washington, DC, 1994, pp. 316–323.

*Primary Examiner*—Michael Lewis
*Assistant Examiner*—Peter DiMauro
*Attorney, Agent, or Firm*—Kuffner & Associates

[57] ABSTRACT

The invention provides a catalyst which can convert methane, carbon monoxide, and nitrogen oxides in lean, stoichiometric, and rich air/fuel environments. Support (A) of the catalyst comprises an alumina support impregnated with Pd providing lean methane conversions and support (B) of the catalyst comprises ceria/lanthana/alumina impregnated with Pd providing stoichiometric methane conversion. Rhodium may be substituted for all or part of the Pd on an alumina support.

4 Claims, 1 Drawing Sheet

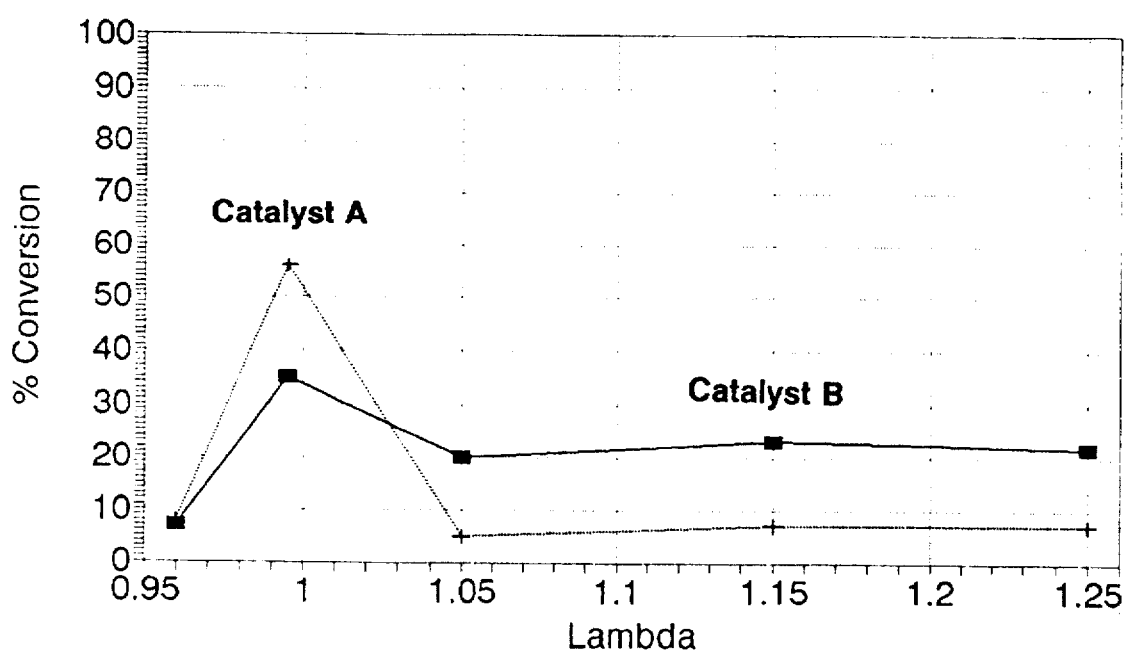

5,741,467

PALLADIUM CATALYST WASHCOAT SUPPORTS FOR IMPROVED METHANE OXIDATION IN NATURAL GAS AUTOMOTIVE EMISSION CATALYSTS

BACKGROUND OF THE INVENTION

1. Field of the Invention

Natural gas has appeal as a vehicle fuel because of its economic and environmental advantages over gasoline. Emissions of reactive hydrocarbons, carbon monoxide, and particulate matter are very low from natural gas fueled engines, but catalysts are still necessary to meet emissions standards. This invention relates generally to methods for treating the exhaust of natural gas fueled vehicles in order to reduce the emission of methane and carbon monoxide and reduce nitrogen oxides in the exhaust gas. In particular, this invention relates to a two-part catalyst support system for palladium catalysts used in such methods.

2. Description of the Related Art

Catalysts for methane oxidation are known. C. S. Weaver discusses such catalysts in SAE paper #892133, "Natural Gas Vehicles—A Review of the State of the Art." S. H. Oh et al. in *J. Catal.*, 132, 287 (1991) tested cerium-containing noble metal catalysts for methane oxidation. R. F. Hicks et al. tested $Al_2O_3$-supported and $ZrO_2$-supported noble metal catalysts for methane oxidation in *J. Catal.*, 122, 280 (1990) and $Pd/Al_2O_3$ catalysts in *J. Catal.*, 122, 295 (1990). A method for reducing methane exhaust emissions using a platinum or platinum/palladium catalyst was taught in U.S. Pat. No. 5,131,224.

SUMMARY OF THE INVENTION

The present invention provides a catalyst for treating the exhaust gas of a natural gas fueled engine and the process of converting the exhaust gases of a natural gas fueled engine with such catalyst. The present invention also provides an improved palladium catalyst washcoat support system which is effective in oxidizing methane and carbon monoxide and reducing nitrogen oxides in lean, stoichiometric, and rich air/fuel environments.

The catalyst of the invention comprises two washcoat supports, the first washcoat support consisting essentially of alumina and the second washcoat support comprising alumina promoted with effective amounts of ceria and lanthana. The catalyst further contains an effective amount of palladium, at least a portion of which may be substituted with rhodium. The noble metals may be impregnated into the supports either before or after the washcoating steps.

The washcoat supports may be in the form of alumina pellets and the catalyst may comprise a mixture of said pellets. Alternatively, the alumina of the washcoat supports may be in powdered form and the supports separately washcoated onto a monolithic substrate. In such case, a calcination step must be carried out after each coating. In another embodiment, the alumina of both the first support and the second support may be in powdered form and the two powders co-milled to prepare a single washcoat slurry, which is thereafter washcoated onto a monolithic substrate.

DESCRIPTION OF THE DRAWING

FIG. 1 is a comparative plot of conversion results obtained using the catalysts 'A' and 'B' prepared in Example 3. The percent conversion is plotted against Lambda, which is a measure of how the actual air/fuel ratio employed differs from that which would be exist at stoichiometric conditions. Lambda is obtained by dividing the actual air/fuel ratio by 14.6 (the theoretical stoichiometric ideal).

DESCRIPTION OF THE PREFERRED EMBODIMENT(S)

Supports

In a preferred catalyst according to this invention, two different palladium catalyst supports are combined. For the conversion of exhaust gases produced when methane is burned in a lean combustion gas mixture (air/fuel ratio (A/F)>14.6, Lambda>1.0), the first support is alumina. For conversion of gases produced when the fuel mixture is stoichiometric or rich, the second support will be alumina promoted with a base metal combination of lanthanum and cerium oxides.

The preferred catalyst supports of the instant invention thus have two distinct parts: Support (A) comprising alumina, and support (B) comprising ceria and lanthana impregnated into alumina. The first support, consisting substantially of alumina, will typically contain from about 6 to about 250 g/L alumina, preferably from about 90 to about 150 g/L, based on finished catalyst. The second support (for converting methane in a stoichiometric or rich gas) is alumina promoted with a combination of cerium oxide and lanthanum oxide. In general, an amount of cerium oxide on the finished catalyst in the range from about 6 to about 250 g/L, preferably from 14 to 53 g/L, and an amount of lanthanum oxide in the range from about 2 to about 200 g/L, preferably from 10 to 15 g/L, have been found effective as promoter.

The promoter elements will typically be applied separately as decomposable compounds, usually in an aqueous solution, by methods familiar to those skilled in the art. Examples of such compounds include the halides, nitrates, and acetates, preferably the acetates. After calcining at a temperature of 400° C. to 700° C. for from 1 to 3 hours, the promoter elements will be present as their metal oxides.

Substrate

The catalyst substrate may be in the form of pellets or a monolith, e.g., a ceramic or metallic honeycomb, having a cell density on the order of 64 square cells/cm$^2$.

Noble Metals

The noble metal components of the invention catalyst will be selected from the group consisting of palladium and rhodium. Typically, palladium and, optionally, a surface layer of rhodium will be impregnated into support (A) and palladium impregnated into support (B). For a rich gas mixture all or part of the palladium impregnated into support (A) may be substituted with rhodium. The amount of palladium typically employed overall in the catalyst will range from about 0.2 to about 20 g/L, preferably from 0.6 to about 6 g/L. The amount of rhodium employed should be no greater than from 0.05 to 2.0 g/L, preferably from 0.07 to 0.4 g/L, based on the total weight of the catalyst.

The noble metals are applied to the support by decomposing a noble metal compound which has been deposited on the support. Examples of such compounds include the following: chloropalladic acid, palladium chloride, palladium nitrate, diamminepalladium hydroxide, tetraamminepalladium chloride, rhodium trichloride, hexaamminerhodium chloride, rhodium carbonylchloride, rhodium trichloride hydrate, rhodium nitrate, sodium hexachlororhodate, and sodium hexanitrorhodate. Preferred compounds would be chloropalladic acid and rhodium chloride.

Catalyst Preparation

Catalysts of the instant invention may be prepared by methods known to those skilled in the art and which have in common the use of alumina as the support for noble metals and promoters. Washcoating a monolithic substrate is done by slurrying a powder in water or another suitable liquid, and then by immersing, spraying, or otherwise covering the monolith with the slurry. The slurry-coated substrate may then be calcined at temperatures in the range about 400° to 700° C. for about 1 to about 3 hours. Impregnation of a support is accomplished typically by applying an aqueous solution of the compound to be impregnated to the support, then calcining the support at from about 400° to about 700° C. for 1 to 3 hours. The compounds may be co-impregnated or sequentially impregnated.

The catalysts may be prepared in various ways. For example, the alumina powder may be pre-impregnated with promoters and/or with noble metals before washcoating. Or the promoters may be applied to the support before washcoating and the noble metals applied after washcoating. Or both may be applied after washcoating. Where the alumina is in the form of pellets, the pellets may be impregnated with the promoters, then with the noble metals.

In another embodiment, the alumina of supports (A) and (B) is in the form of alumina pellets and the catalyst comprises a mixture of support (A) pellets and support (B) pellets each containing the noble metal impregnated therein. Alternatively, the alumina of supports (A) and (B) can be in the powdered form and supports (A) and (B) layered onto a monolithic substrate by being separately washcoated onto the substrate with a calcination step after each coating. Either support (A) or support (B) may be washcoated first. In a particularly preferred embodiment, the alumina of supports (A) and (B) is in the powdered form and powders (A) and (B) are co-milled to prepare a washcoat slurry which is then washcoated onto a monolithic substrate in a single pass. In still another embodiment, one end of a monolithic substrate may be coated with alumina, while the other end is coated with La—Ce—alumina and the entire substrate then impregnated with palladium and, optionally, rhodium.

EXAMPLE I

Catalyst 'Pd/Ce/La'

An experimental catalytic composite was prepared with Pd, Ce, and La on a $\gamma$-$Al_2O_3$ support. A $CeO_2/La_2O_3/\gamma$-$Al_2O_3$ powder was prepared by impregnating Kaiser forming grade alumina with cerium acetate and lanthanum acetate solutions such that the $Al_2O_3/Ce$ ratio is 2.16 and the $Al_2O_3/La$ ratio is 6.48. The impregnated alumina was then calcined to $\gamma$-$Al_2O_3$. The resulting slurry was applied to a cordierite monolith which had 64 square cells per square centimeter. The volume of the monolith was 0.9 L and the total mount of washcoat was 160 g/L. The washcoated monolith was calcined and then immersed in an aqueous solution of $H_2PdCl_4$. The resulting impregnated monolith contained 1.4 g/L Pd, 42.4 g/L Ce, and 14.1 g/L La. This catalyst will be designated 'Pd/Ce/La.'

Catalyst 'Pd'

Another experimental catalytic composite was prepared with Pd on a $\gamma$-$Al_2O_3$ support. A $\gamma$-$Al_2O_3$ powder prepared by calcining Kaiser forming grade alumina was slurried and applied to a cordierite monolith which had 64 square cells per square centimeter. The volume of the monolith was 1.5 L and the amount of washcoat applied was 124 g/L. The washcoated monolith was calcined and then immersed in an aqueous solution of $H_2PdCl_4$. The resulting impregnated monolith contained 1.4 g/L Pd. This catalyst will be designated 'Pd.'

Catalyst 'Pt'

A comparative catalytic composite was prepared with Pt on a $\gamma$-$Al_2O_3$ support. Kaiser Versal GHD 250, a high density $\gamma$-$Al_2O_3$ powder, was slurried and applied to a cordierite monolith which had 64 square cells per square centimeter. The volume of the monolith was 1.5 L and the total amount of washcoat was 122 g/L. The washcoated monolith was calcined and then immersed in an aqueous solution of $H_2PtCl_6$. The resulting impregnated monolith contained 1.4 g/L Pt. This catalyst will be designated 'Pt.'

Catalyst 'Pt/Pd'

Another comparative catalytic composite was prepared with Pt and Pd on a $\gamma$-$Al_2O_3$ support. Kaiser Versal GHD 250, a high density $\gamma$-$Al_2O_3$ powder, was slurried and applied to a cordierite monolith which had 64 square cells per square centimeter. The volume of the monolith was 1.5 L and the total amount of washcoat was 122 g/L. The washcoated monolith was calcined and then immersed in an aqueous solution of $H_2PtCl_6$ and $H_2PdCl_4$ with 5 wt. % sugar. The resulting impregnated monolith contained 1.1 g/L Pd and 0.28 g/L Pt. This catalyst will be designated 'Pt/Pd.'

EXAMPLE 2

Samples of the catalysts prepared in Example 1 were aged at 1000° C. for 4 hours in nitrogen containing 10% air. Both fresh and aged catalysts were then tested for hydrocarbon, carbon monoxide, and nitrogen oxide conversion. Both fresh and aged catalysts were tested in a lean gas mixture, and fresh catalysts were also tested in a stoichiometric gas mixture achieved by switching the gas going over the catalyst from a lean gas mixture to a rich gas mixture at 0.5 Hz. The lean gas mixture consisted of 2000 ppm $CH_4$, 0.2% CO, 0.11% $NO_x$, 10% $CO_2$, 3% $O_2$, 0.067% $H_2$, 10% $H_2O$, with the balance being $N_2$. The rich gas mixture consisted of 2000 ppm $CH_4$, 1.4% CO, 0.11% $NO_x$, 12% $CO_2$, 1% $O_2$, 0.46% $H_2$, 10% $H_2O$, in an $N_2$ balance. Catalysts were evaluated in a laboratory stainless steel reactor. The stoichiometric gas mixture was obtained by having the lean and rich gas mixtures modulated at ±1 A/F at 0.5 Hz.

Results of the tests appear in Tables I, II, and III. Columns having asterisks, '* * *', in place of numbers indicate that the catalyst did not achieve 50% conversion. Table I shows the results of tests done with the lean gas mixture. The data show that the Pd and Pt/Pd catalysts achieved over 90% methane conversion at 500° C., while Pd/Ce/La had only 63% conversion and Pt only 10% conversion. In addition, the fresh methane light-off temperature (the temperature at 50% conversion) for the Pd catalyst was 91° C. better than that of the Pt/Pd catalyst and 132° C. better than that of the Pd/Ce/La catalyst. $NO_x$ conversion during lean operation is low, as expected.

TABLE I

| Catalyst | | Pd/Ce/La | Pd | Pt | Pt/Pd |
|---|---|---|---|---|---|
| 566° C. | HC | 85 | 98 | 35 | 97 |
| | CO | 99 | 99 | 99 | 99 |
| | $NO_x$ | 5 | 8 | 15 | 9 |
| 500° C. | HC | 63 | 96 | 10 | 94 |
| | CO | 99 | 99 | 99 | 99 |
| | $NO_x$ | 1 | 6 | 17 | 10 |
| 450° C. | HC | 35 | 88 | 4 | 83 |
| | CO | 99 | 99 | 99 | 99 |
| | $NO_x$ | 2 | 2 | 24 | 13 |
| 400° C. | HC | 14 | 64 | 2 | 51 |
| | CO | 99 | 99 | 99 | 99 |
| | $NO_x$ | 2 | 2 | 33 | 15 |
| T, °C. at 50% conv. | HC | 475 | 343 | *** | 434 |
| | CO | 156 | 185 | 206 | 182 |
| | $NO_x$ | *** | *** | *** | *** |

Results of the test with the stoichiometric gas mixture appear in Table II and show that Pd/Ce/La is superior to Pt and Pt/Pd. Pd/Ce/La improves the light-off temperature over Pd by 140° C. (although it increases lean light-off by the same amount).

TABLE II

|  |  | Pd/Ce/La | Pd | Pt | Pt/Pd |
|---|---|---|---|---|---|
| 566° C. | HC | 96 | 72 | 95 | 75 |
|  | CO | 98 | 62 | 64 | 65 |
|  | NO$_x$ | 100 | 61 | 62 | 65 |
| 500° C. | HC | 94 | 62 | 80 | 66 |
|  | CO | 99 | 65 | 67 | 68 |
|  | NO$_x$ | 100 | 62 | 64 | 65 |
| 450° C. | HC | 87 | 44 | 58 | 47 |
|  | CO | 99 | 68 | 71 | 72 |
|  | NO$_x$ | 100 | 63 | 66 | 67 |
| 400° C. | HC | 74 | 26 | 37 | 30 |
|  | CO | 100 | 69 | 74 | 74 |
|  | NO$_x$ | 100 | 65 | 69 | 69 |
| T, °C. at 50% | HC | 356 | 496 | 456 | 479 |
| conv. | CO | 204 | 246 | 272 | 225 |
|  | NO$_x$ | 182 | 211 | 262 | 189 |

Finally, results of the test of the aged catalysts with the lean gas mixture appear in Table III. As for the fresh catalysts, Pd and Pt/Pd have the best methane conversion, especially at higher temperature operation.

TABLE III

|  |  | Pd/Ce/La | Pd | Pt | Pt/Pd |
|---|---|---|---|---|---|
| 566° C. | HC | 55 | 86 | 12 | 78 |
|  | CO | 98 | 98 | 98 | 98 |
|  | NO$_x$ | 8 | 12 | 21 | 8 |
| 500° C. | HC | 30 | 64 | 8 | 55 |
|  | CO | 98 | 98 | 98 | 98 |
|  | NO$_x$ | 6 | 9 | 24 | 5 |
| 450° C. | HC | 11 | 28 | 7 | 23 |
|  | CO | 98 | 98 | 98 | 98 |
|  | NO$_x$ | 5 | 9 | 29 | 4 |
| 400° C. | HC | 5 | 11 | 6 | 7 |
|  | CO | 98 | 98 | 98 | 98 |
|  | NO$_x$ | 4 | 8 | 32 | 4 |
| T, °C. at 50% | HC | *** | 503 | *** | 519 |
| conv. | CO | 194 | 202 | 241 | 211 |
|  | NO$_x$ | *** | *** | *** | *** |

EXAMPLE 3

Two catalysts were prepared to compare the effects of relatively higher Ce and La content to a powdered Al$_2$O$_3$ support. The supports were applied in a slurry as washcoats to a monolith carrier having volumes of 1.7 L and 6 cells per square inch. The coated monolith was then impregnated with a Pd solution.

Catalyst 'A'

An experimental catalytic composite was prepared with Pd, Ce, and La on a powdered Al$_2$O$_3$ support. A CeO$_2$/La$_2$O$_3$/Al$_2$O$_3$ powder was prepared by impregnating Condea Puralox SCFA-90 with cerium acetate and lanthanum acetate solutions to yield an Al$_2$O$_3$/Ce weight ratio of 0.48 and an Al$_2$O$_3$/La weight ratio of 1.62. The mixture was dried and then calcined at 538° C. for one hour. The resulting powder was slurried in water with nitric acid and barium sulfate and applied to a cordierite monolith for a total washcoat of 259 g/L. The washcoated monolith was calcined and then immersed in an aqueous solution of palladium chloride. The resulting impregnated monolith contained 2.65 g/L Pd, 121.8 g/L Ce, 36.2 g/L La, and 5.30 g/L Ba. This catalyst will be designated 'A'.

Catalyst 'B'

A comparative catalytic composite was prepared in the same manner, but having only Pd on a powdered Al$_2$O$_3$ support having a total washcoat of 110 g/L. The finished impregnated monolith contained 2.65 g/L Pd.

Samples of Pd catalyst A (Pd—Ce—La) and catalyst B were aged in air at 1000° C., and then evaluated for methane conversion at 450° C. during lean (Lambda>1.0) and rich conditions (Lambda<1.0). The results are shown in FIG. 1. The results indicate advantages for catalyst A containing Ce and La near the stoichiometric point (Lambda=1) and for slightly rich operation. For lean operation (Lambda>1) catalyst B without Ce and La has better methane conversions.

Methane conversions during slightly rich conditions are shown to increase with increasing Ce content in the washcoat of these catalysts, especially up to about 10%. The effect of Ce is generally known to increase precious metal dispersion, stability, and oxygen-storage capability which is beneficial for stoichiometric-to-rich operation.

Higher methane conversions over Pd are favored at lower Pd metal dispersions, as would occur with lower Ce-containing catalysts or more thermally sintered Pd catalysts.

We claim:

1. A process for treating the exhaust gas of a natural gas fueled automotive engine, said engine operating alternately in lean, stoichiometric, and rich air/fuel modes, comprising contacting the exhaust gas with a catalyst consisting of:

a substrate;

a first washcoat support, dispersed on said substrate, consisting of alumina;

a second washcoat support, dispersed on said first washcoat support, consisting of alumina and sufficient amounts of ceria and lanthana to promote treatment of the exhaust gas when the engine is operating in stoichiometric and rich air/fuel modes; and an amount of palladium, sufficient to catalyze the oxidation of hydrocarbons and carbon monoxide and the reduction of nitrogen oxides contained in said exhaust gas, impregnated into the first and second washcoat supports.

2. The process of claim 1 wherein the alumina of the washcoat supports is in powdered form, the substrate is a monolith, and the first washcoat support is applied to the substrate and calcined and then the second washcoat support is applied and calcined.

3. The process of claim 1 wherein the amount of palladium in the catalyst is from 0.2 to 20 g/L, the amount of ceria is from 6 to 250 g/L, and the amount of lanthana is from 2 to 200 g/L.

4. A process for treating the exhaust gas of a natural gas fueled automotive engine, said engine operating alternately in lean, stoichiometric, and rich air/fuel modes, comprising contacting the exhaust gas with a catalyst consisting of:

first pellets consisting of alumina;

second pellets consisting of alumina and sufficient amounts of ceria and lanthana to promote treatment of the exhaust gas when the engine is operating in stoichiometric and rich air/fuel modes, mixed with said first pellets; and an amount of palladium, sufficient to catalyze the oxidation of hydrocarbons and carbon monoxide and the reduction of nitrogen oxides contained in said exhaust gas, impregnated into said first and second pellets.

* * * * *